US007800340B2

(12) United States Patent  (10) Patent No.: US 7,800,340 B2
Berntsen et al.  (45) Date of Patent: Sep. 21, 2010

(54) FUEL CELL ASSEMBLY USING MULTIPLE FUEL CELL STACKS AND CONTROL METHOD THEREFOR

(75) Inventors: George Berntsen, Shelton, CT (US); Joel D. Doyon, Bantam, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1171 days.

(21) Appl. No.: 11/430,107

(22) Filed: May 8, 2006

(65) Prior Publication Data

US 2007/0259230 A1 Nov. 8, 2007

(51) Int. Cl.
*H02J 7/00* (2006.01)
*H01M 10/44* (2006.01)
*H01M 10/46* (2006.01)

(52) U.S. Cl. .......................... 320/101; 429/13; 429/22; 429/23

(58) Field of Classification Search .................. 320/101, 320/116; 429/12, 13, 22, 23
See application file for complete search history.

(56) References Cited

U.S. PATENT DOCUMENTS

| | | | |
|---|---|---|---|
| 5,637,414 A | 6/1997 | Inoue et al. | |
| 6,497,974 B2 * | 12/2002 | Fuglevand | 429/22 |
| 7,144,646 B2 * | 12/2006 | Pearson | 429/21 |
| 7,248,490 B2 * | 7/2007 | Olsen et al. | 363/71 |
| 2002/0196025 A1 * | 12/2002 | Freeman et al. | 324/426 |
| 2003/0113599 A1 | 6/2003 | Pearson | |
| 2004/0009380 A1 | 1/2004 | Pearson | |
| 2005/0281064 A1 | 12/2005 | Olsen et al. | |
| 2006/0194082 A1 * | 8/2006 | Tucker et al. | 429/9 |

FOREIGN PATENT DOCUMENTS

JP 2003180080 A * 6/2003

OTHER PUBLICATIONS

Machine Translation for JP 2003180080 A.*

* cited by examiner

*Primary Examiner*—Edwrd Tso
*Assistant Examiner*—Ramy Ramadan
(74) *Attorney, Agent, or Firm*—Cowan, Liebowitz & Latman, PC (57) ABSTRACT

A multi-stack assembly receiving fuel from a fuel supply and producing power output for consumption by a load, the assembly comprising a plurality of fuel cell stacks for producing DC power and forming a plurality of fuel cell stack groups, wherein each of the stack groups includes at least one fuel cell stack, a plurality of inverters corresponding to the plurality of fuel cell stack groups, wherein each of the inverters draws a predetermined amount of DC power from a corresponding fuel cell stack group and converts the DC power to AC power; and a controller for controlling each of the inverters to draw the predetermined amount of DC power from the corresponding fuel cell stack group so as to satisfy power requirements of the load.

29 Claims, 6 Drawing Sheets

FUEL CELL ASSEMBLY USING MULTIPLE FUEL CELL STACKS AND CONTROL METHOD THEREFOR

BACKGROUND OF THE INVENTION

This invention relates to fuel cell systems and, in particular, to multi-stack fuel cell assemblies.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. Molten carbonate fuel cells ("MCFC") systems operate by passing a reactant fuel gas through the anode, while oxidizing gas is passed through the cathode.

In order to produce a useful power level, a number of individual fuel cells are conventionally stacked one on the other to form a fuel cell stack. The number of cells in the stack determines the power rating of the stack and to provide systems with higher power ratings, a number of fuel cell stacks are utilized and the outputs of the fuel cell stacks are combined to provide the desired power output. An example of a multi-stack fuel cell system is described in U.S. application Ser. No. 10/916,235, assigned to the same assignee herein.

Figure 1:
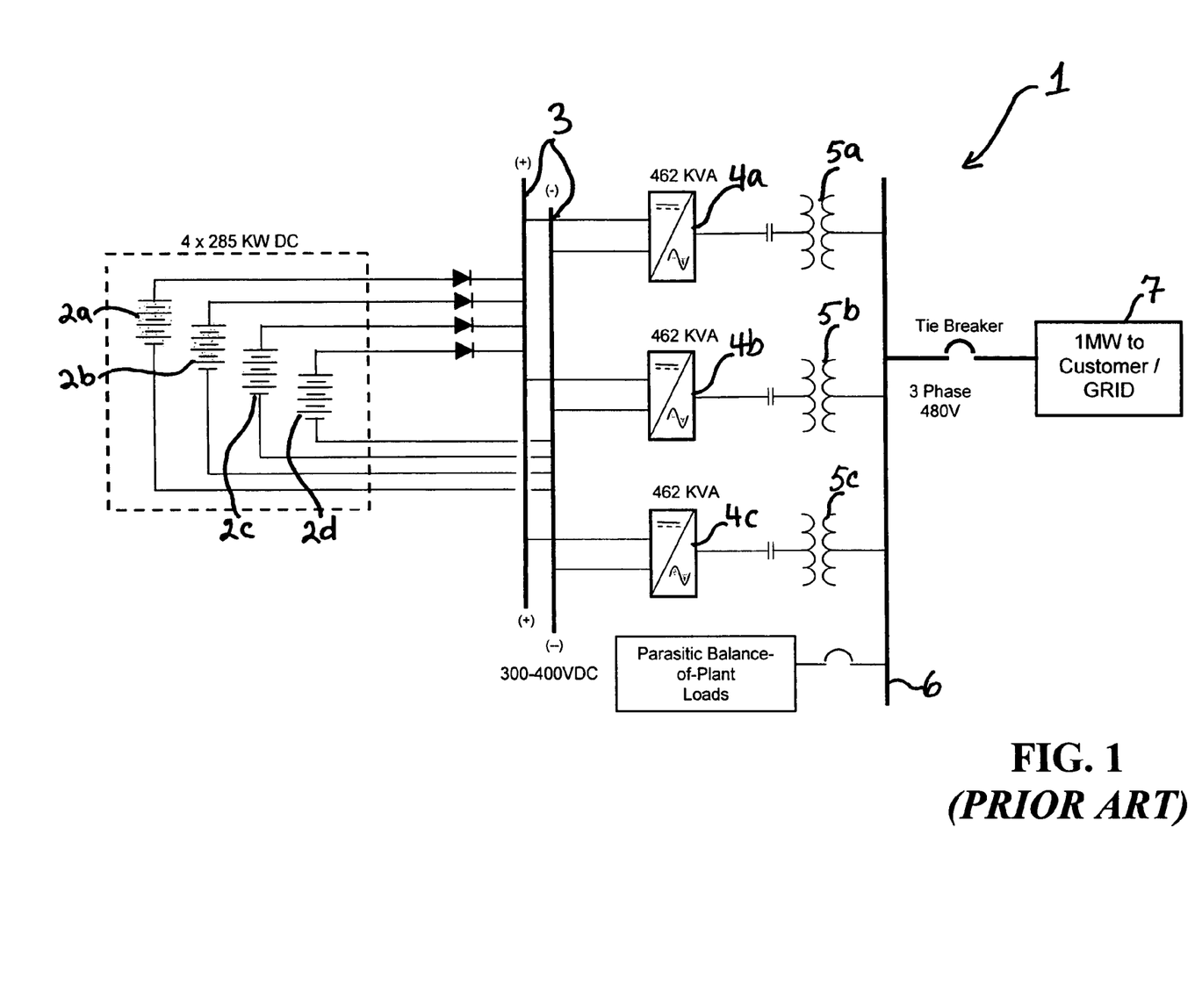
FIG. 1 shows a conventional multi-stack assembly employing a DC bus and a plurality of inverters.

The fuel cell stacks produce electrical output in the form of a direct current (DC). The DC current produced by the fuel cell stack can be converted to conventional AC power using an inverter. In a single-stack assembly, the fuel cell stack is coupled to an inverter and DC current produced by the stack is drawn by the inverter to convert the DC current to AC power. Conventional multi-stack assemblies employ a DC bus to connect the positive polarities of the stacks and the negative polarities of the stacks in the assembly so that the multi-stack assembly functions as a single power source. The DC bus has a plurality of inverters coupled thereto and the DC current supplied to the DC bus is drawn by the inverters and converted to AC power. An example of this multi-stack assembly is shown in FIG. 1, in which the assembly 1 includes four fuel cell stacks 2a-2d, a DC bus 3 to which the positive polarities and the negative polarities of the stacks 2a-2d are connected, and three DC-to-AC inverters (4a-4c) connected to the DC bus and drawing DC power from the DC bus to convert the DC power to AC power. AC power produced in each inverter 4a-4c is supplied to a corresponding transformer 5a-c, which steps up the voltage of the inverter output to 480V. AC power at 480V is supplied to a customer bus 6 and thereafter to the consumer 7.

The advantages of conventional assemblies, as shown in FIG. 1, are that the number of inverters required is fewer than the number of the stacks in the assembly and that the assembly is capable of continued operation if one of the inverters fails. However, the assembly is not capable of continued operation if one of the fuel cell stacks in the multi-stack assembly fails since there is no means for isolating the failed stack from the fuel and oxidant gases supplied to the other stacks in the assembly. The use of the DC bus in conventional multi-stack assemblies does not allow biasing of individual stack currents through control of individual inverters so as to reduce the amount of DC current drawn by the inverters if one of the stacks in the conventional multi-stack assembly is weak and produces less DC power than the other stacks. Moreover, the use of the DC bus requires customization of the DC bus, which results in increased manufacturing and operating costs.

Accordingly, a multi-stack assembly having a simple and cost effective construction while avoiding the above disadvantages is needed.

It is therefore an object of the present invention to provide a multi-stack assembly that is cost effective and has a simple construction without requiring a DC bus and which is capable of continued operation if one of the fuel cell stacks in the assembly fails or produces less power than the other stacks.

It is a further object of the present invention to provide a multi-stack assembly which allows for increased power output without affecting fuel cell durability and without requiring additional electrical isolation.

It is a further object of the present invention to provide a method of controlling a multi-stack assembly which allows control of individual inverters in the assembly.

SUMMARY OF THE INVENTION

In accordance with the embodiments of the invention disclosed hereinafter, the above and other objectives are realized in a multi-stack assembly receiving fuel from a fuel supply and producing power output for consumption by a load, the assembly comprising a plurality of fuel cell stacks for producing DC power and forming a plurality of fuel cell stack groups, wherein each of the stack groups includes at least one fuel cell stack, a plurality of inverters corresponding to the plurality of fuel cell stack groups, wherein each of the inverters draws a predetermined amount of DC power from a corresponding fuel cell stack group and converts the DC power to AC power; and a controller for controlling each of the inverters to draw the predetermined amount of DC power from the corresponding fuel cell stack group so as to satisfy power requirements of the load. Each of the fuel cell stacks in the assembly are grounded using either a dedicated or a shared grounding unit.

In certain embodiments, the multi-stack assembly comprises a plurality of fuel cell stack groups, each of which includes a plurality of fuel cell stacks coupled in series to one another. In one illustrative embodiment, each fuel cell stack group comprises a fuel cell stack pair including two fuel cell stacks coupled in series to one another. In particular, the assembly comprises at least a first fuel cell stack pair including a first fuel cell stack coupled in series with a second fuel cell stack, a second fuel cell stack pair, including a third fuel cell stack coupled in series with a fourth fuel cell stack, a first inverter coupled with the first fuel cell stack pair and a second inverter coupled with the second fuel cell stack pair. In this embodiment, the controller controls the first inverter to draw a first amount of DC power from the first fuel cell stack pair and the second inverter to draw a second amount of DC power from the second fuel cell stack pair.

The fuel cell stacks in the first stack pair and the first inverter are connected by coupling one of a positive side and a negative side of the first to an opposing one of a positive side and a negative side of the second fuel cell stack and coupling the first inverter to the other one of the positive side and the negative side of the first fuel cell stack and to the other opposing one of the positive side and the negative side of the second fuel cell stack. The fuel cell stacks in the second pair and the second inverter are similarly connected. In this assembly, the first and fourth stacks may be coupled to a first grounding unit and the second and third fuel cell stacks may be coupled to a second grounding unit. In the alternative, the fuel cell stacks in the assembly may be coupled to a central grounding unit.

In the illustrative assembly provided, the controller controls the first inverter by determining a first inverter set point corresponding to the first amount of DC power to be drawn by the first inverter and controls the second inverter by determining a second inverter set point corresponding to the second amount of DC power to be drawn by the second inverter, wherein the first and second inverter points are based on actual fuel flow rate from the fuel supply to the assembly, DC power required to satisfy the load requirements, first fuel utilization factor for the first inverter, second fuel utilization factor for the second inverter and hydrogen content of the fuel supplied to the assembly. In determining the individual inverter set point for each inverter, the controller determines an overall inverter set point, compares the overall inverter set point to the DC power required from the assembly to select as a Selected Value the smaller of the overall inverter set point and the DC power required from the assembly, and determines the individual inverter set point using the Selected Value.

In certain embodiments, the illustrative multi-stack assembly also includes a fuel supply control member for controlling fuel flow rate of the fuel from the fuel supply to the assembly. The fuel supply control member is controlled by the controller in accordance with a fuel demand which is determined based on DC power required from the assembly to satisfy the load requirements, first fuel utilization factor for the first inverter, second fuel utilization factor for the second inverter and the hydrogen content of the fuel supplied to the assembly.

A method of controlling the multi-stack assembly and, in particular, controlling the individual inverters and the fuel flow control member by the controller, is also disclosed.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 2:
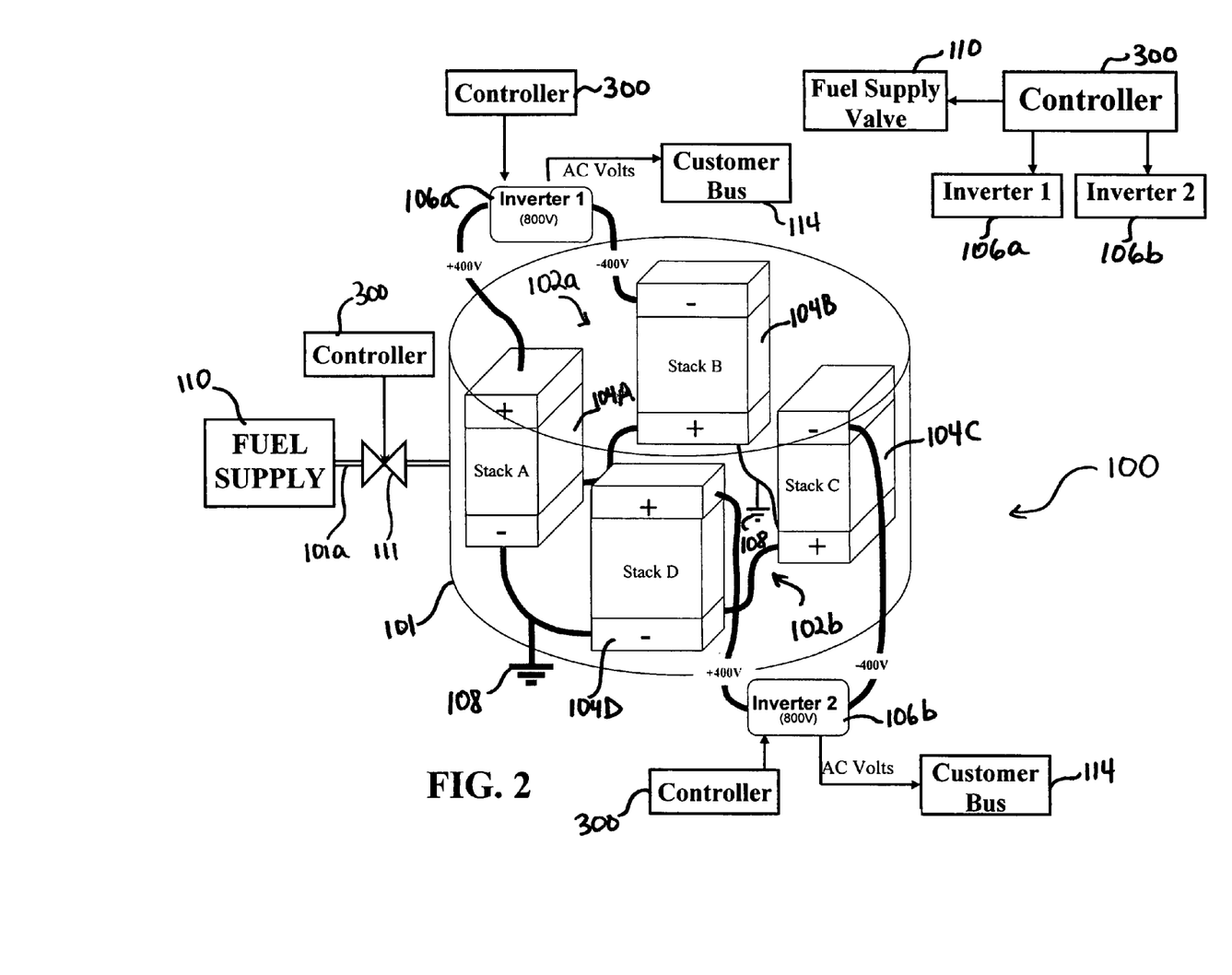
FIG. 2 shows a multi-stack assembly using a plurality of stack pairs and a plurality of inverters corresponding to the stack pairs.

FIG. 2 shows a multi-stack assembly receiving fuel from a fuel supply and producing power for consumption by a load, the assembly comprising a plurality of fuel cell stack groups, each stack group including at least one fuel cell stack, and a plurality of inverters corresponding to the fuel cell stack groups, each of the inverters drawing a predetermined amount of DC power from a corresponding fuel cell stack group and converting the DC power to AC power. The multi-stack assembly also includes a controller for controlling the inverters to draw the predetermined amount of DC power from the corresponding fuel cell stack group so as to satisfy power requirements of the load.

As shown in FIG. 2, the multi-stack assembly comprises a plurality of fuel cell stack pairs 102a-b, wherein each stack pair 102a-b includes two fuel cell stacks 104A-D connected in series with one another, and a plurality of inverters 106a-b for drawing DC power from the stack pairs 102a-b and converting the DC power to AC power, wherein each fuel cell stack pair 102a-b is connected to a corresponding inverter 106a-b. As shown in FIG. 2, the assembly 100 receives fuel from a fuel supply 110 through a connecting line 101a coupled to a housing 101, which houses the fuel cell stack pairs 102a-b. The flow rate of fuel from the fuel supply 110 to the housing 101 of the assembly 100 is controlled by a fuel flow control valve 111. In the housing 101, the fuel flow is divided and supplied to each fuel cell stack 104A-D using connecting lines, or piping (not shown for purposes of clarity and simplicity). The assembly 100 also receives oxidant gas from an air supply (not shown for purposes of clarity and simplicity) which is supplied to the fuel cell stacks 104A-D. The fuel and oxidant supplied to each of the fuel cell stacks 104A-D undergo an electrochemical reaction in the stacks 104A-D to produce electric DC power. The operation of the assembly 100 is controlled by a controller 300 as described in more detail below.

In the illustrative embodiment shown in FIG. 2, the assembly 100 includes a first fuel cell stack pair 102a, comprising a first fuel cell stack 104A and a second fuel cell stack 104B, and a second fuel cell stack pair 102b, comprising a third fuel cell stack 104C and a fourth fuel cell stack 104D. As mentioned above, the first fuel cell stack pair 102a is formed by connecting the first fuel cell stack 104A and the second fuel cell stack 104B in series, while the second stack pair 102b is formed by connecting the third fuel cell stack 104C and the fourth fuel cell stack 104D in series. The series connection between the first and second stacks 104A-B is formed by coupling a negative side of the first stack 104A to a positive side of the second stack 104B, while the series connection between the third and fourth stacks 104C-D is formed by coupling a positive side of the third stack 104C and a negative side of the fourth side 104D.

As shown in FIG. 2, the assembly 100 also includes a first inverter 106a coupled with the first stack pair 102a and a second inverter 106b coupled with the second stack pair 102b. Inverters suitable for use in the assembly 100 include 1200V IGBT (Insulated Gate Bipolar Transistor) inverters, which are most commonly commercially available at a relatively low cost, or SMW (Sub-Mega Watt) inverters. Specifically, the first inverter 106a is coupled with a positive side of the first stack 104A and with a negative side of the second stack 104B, which allows the inverter 106a to draw the DC power produced by the first and second stacks 104A, 104B. Similarly, the second inverter 106b is coupled with a positive side of the fourth stack 104D and with a negative side of the third stack 104C which allows the DC power produced by the third and fourth stacks 104C-D to be drawn by the inverter 106b. As discussed above, the first and second inverters 106a, 106b convert the DC power drawn from the first and second stack pairs 102a, 102b, respectively, to AC power. AC power outputted by the inverters is supplied to a customer bus 114 via one or more transformers (not shown for purposes of clarity and simplicity) and thereafter to the consumer or to a power grid.

The use of one inverter 106a, 106b for each stack pair 102a, 102b for converting DC power produced by each stack pair 102a, 102b to AC power results in improved performance and efficiency of the assembly 100. As can be appreciated, the DC power produced by each stack pair 102a-b is a combination of the DC power produced by each stack in the stack pair, and thus the voltage of the DC power outputted by each stack pair 102a-b is approximately double the voltage produced by each individual stack. The DC voltage produced by the individual fuel cell stacks is typically between 300 and 400V, with an optimal voltage for each stack being about 350V. Thus, the assembly of FIG. 2 has a higher voltage power output resulting from connecting the fuel cell stacks in each stack pair in series.

Moreover, the inverters 106a, 106b in the assembly 100 shown in FIG. 2 operate at an optimum DC input voltage from the fuel cell stack pairs 102a, 102b. It is understood that when an inverter converts DC power to AC power, some power is lost during the conversion operation. This loss of power during conversion of DC power to AC power can be limited by inputting a predetermined optimal DC input voltage, corresponding to a predetermined amount of DC power, to the inverter so as to minimize the losses-to-power output ratio. The optimal DC input voltage to the inverters used in multi-stack assemblies is typically about twice the DC voltage produced by the individual fuel cell stacks. For example, the optimal DC input voltage for 1200V IGBT inverters is about 750 Volts DC whereas the DC voltage produced by individual stacks is between 300 and 400 Volts.

In the assembly 100 of FIG. 2, the DC input voltage from each stack pair 102a, 102b to the corresponding inverter 106a, 106b is about 800 Volts DC, which is the optimal DC input voltage, or is close to the optimal DC input voltage. As a result, the power losses resulting from DC to AC power conversion are minimized and the performance and efficiency of the inverters 106a, 106b are optimized.

As shown in FIG. 2, the first, second, third and fourth fuel cell stacks 104A-D of the multi-stack assembly 100 are also connected to ground 108, such as by coupling the fuel cell stacks 104A-D to one or more grounding units. In the illustrative embodiment shown, the negative sides of the first and fourth fuel cell stacks 104A, 104D are connected to ground 108, while the positive sides of the second and third fuel cell stacks 104B, 104C are also connected to ground 108. Although the illustrative embodiment in FIG. 2 includes two grounding connections, such that one connection to ground is between the first and fourth fuel cell stacks 104A, 104D and the other connection to ground is between the second and third fuel cell stacks 104B, 104C, the assembly 100 may use one central grounding tap 108 for connecting all of the fuel cell stacks 104A-D to ground. The connection of the fuel cell stacks 104A-D to ground 108 minimizes the stack voltage differential to ground. As a result, electrical isolation requirements for the multi-stack assembly 100 are minimized, notwithstanding the higher voltage being outputted by the assembly 100.

It is understood that the multi-stack assembly 100 shown in FIG. 2 is illustrative and is not limited to multi-stack assemblies using four fuel cell stacks. For example, in certain embodiments, the multi-stack assembly 100 of FIG. 2 may be used as a repeating module in assemblies comprising eight, twelve, sixteen, or more stacks. In other embodiments, the multi-stack assembly may include any number of stack pairs with a corresponding inverter coupled with, and drawing DC power from, each stack pair.

As mentioned above and shown in FIG. 2, the operation of the multi-stack assembly 100 is controlled by the controller 300. In particular, the controller 300 determines the amount of fuel flow required to support a load receiving power from the assembly 100 and controls the fuel flow control valve 111 to control the flow rate of fuel to the assembly 100. The controller also determines an inverter set point (hereinafter "Inverter SP-n," wherein n identifies a specific inverter) for each inverter and controls the amount of DC power drawn by each inverter from the corresponding stack pair based on the Inverter SP-n. The operations of the controller 300 to control the fuel flow control valve 111 to control the flow of fuel to the assembly 100 and to control the DC power drawn by each inverter 106a-b are shown in FIGS. 3A and 3B and described herein below.

Figure 3A:
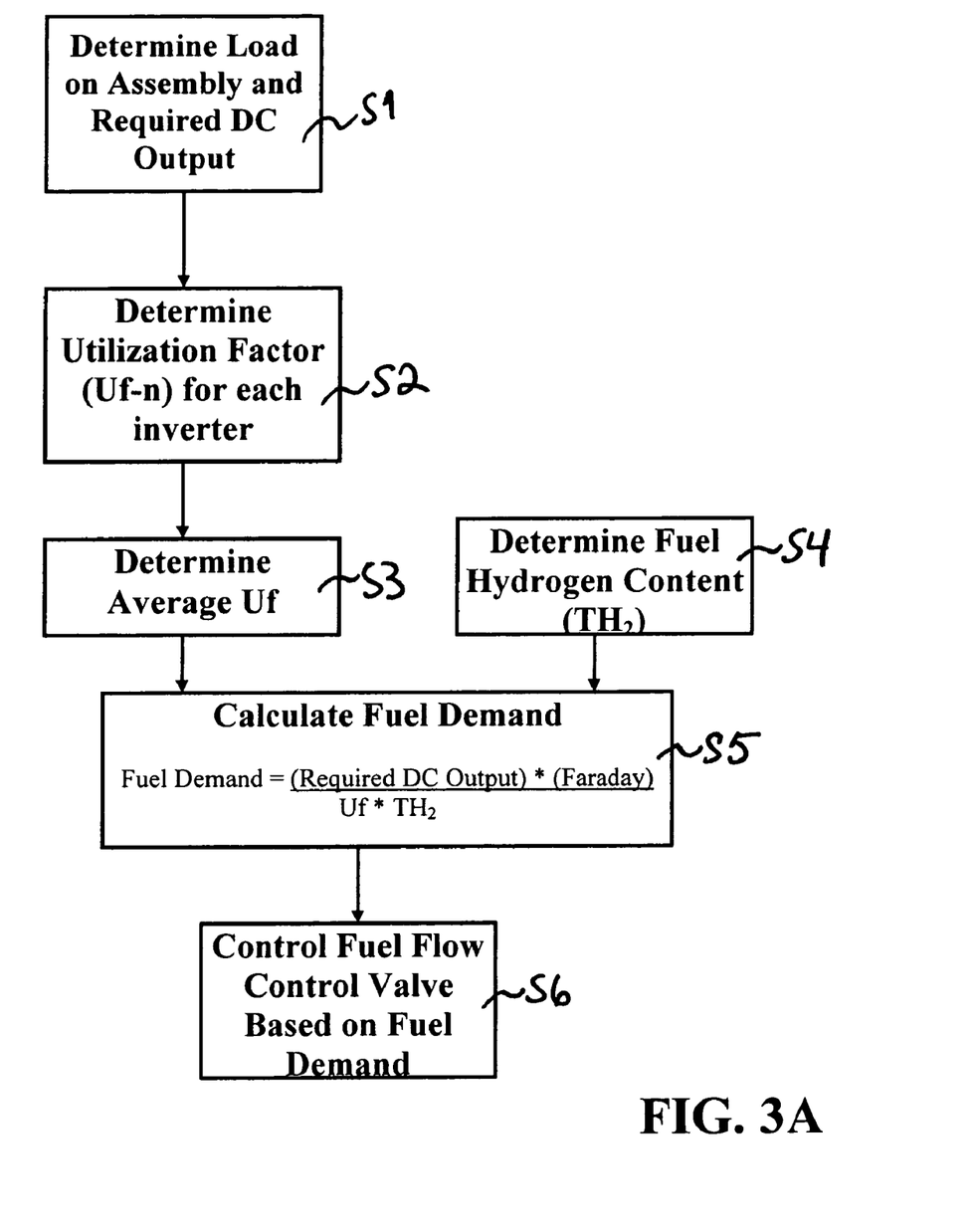
FIG. 3A shows operation of a controller of the multi-stack assembly to control fuel flow to the assembly.
Figure 3B:
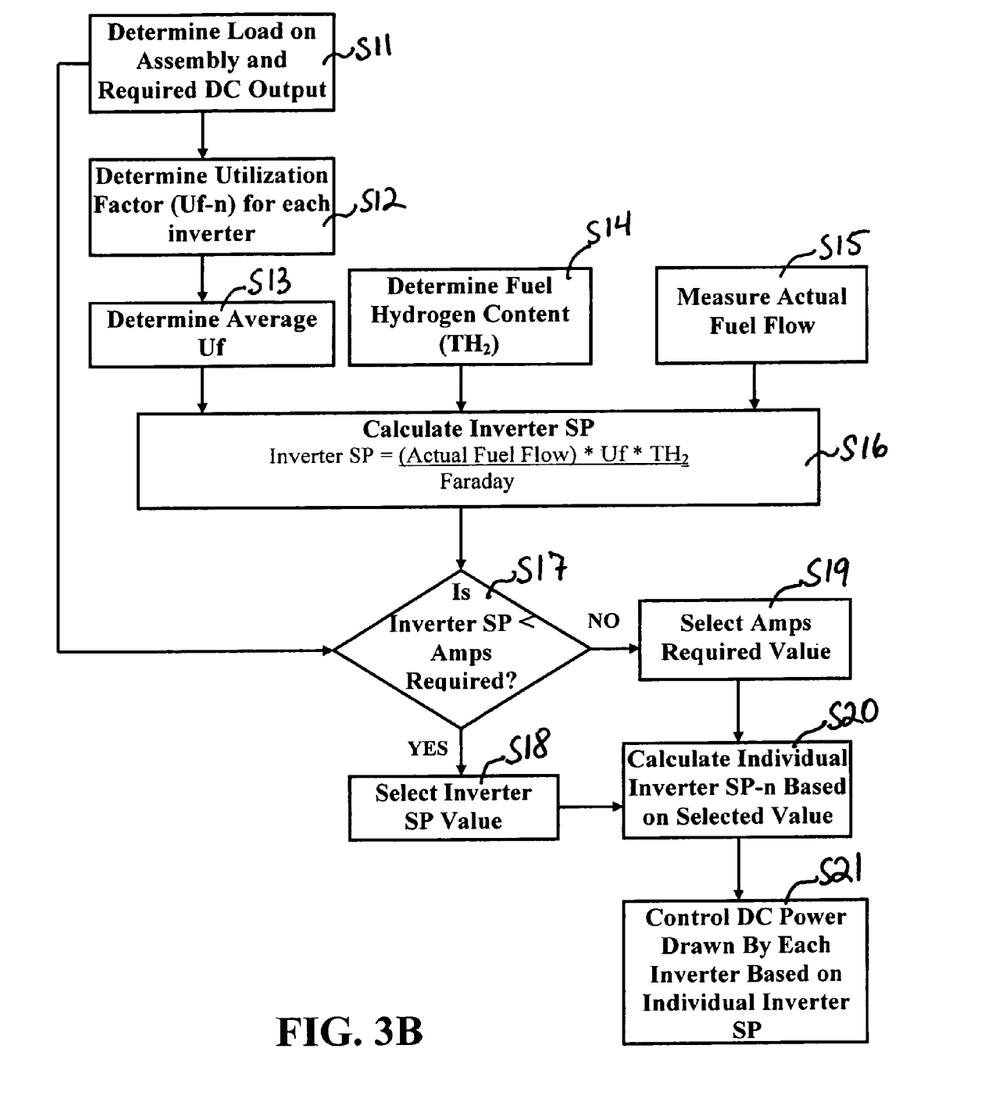
FIG. 3B shows operation of the controller to control individual inverters of the multi-stack assembly.

FIG. 3A illustrates the operation of the controller 300 to control the fuel flow control valve 111 so as to control the flow of fuel to the housing 101 of the multi-stack assembly 100 based on fuel demand. As shown in FIG. 3A, the controller 300 determines in a first step S1 the electric power load on the assembly 100 and the DC power output required from the assembly to satisfy the load. If the assembly 100 is connected to a power grid, the power load on the assembly 100 is set by an operator using the controller 300. If the assembly 100 is not connected to a power grid, the power load on the assembly 100 is determined by an "island load," which is a load connected to and receiving electrical power from the assembly 100. Based on the power load on the assembly 100, the controller determines the DC output which needs to be produced by the fuel cell stacks 104A-D of the assembly 100 in order to satisfy the power load on the assembly 100. The required DC output is directly related to the power load on the assembly 100.

The operation of the controller 300 then proceeds to a second step S2, in which a fuel utilization factor, Uf-n, is determined for each inverter based on the required DC output. As can be appreciated, fuel supplied to the assembly 100 stores chemical energy which is converted in the fuel cell stacks 104A-D to DC electricity and heat energy. The fuel utilization factor (Uf) is a percentage of chemical energy stored in the fuel that is converted to electric DC power. The desired fuel utilization factor is directly proportional to the required DC output and the power load on the assembly, such that at high power loads, the desired fuel utilization factor is also high so as to maximize the assembly's electrical efficiency, whereas at low power loads, a low fuel utilization factor is desired in order to provide enhanced fuel distribution through the fuel cell stacks and to reduce demand for external heating. Each inverter 106a, 106b of the assembly 100 has a predetermined fuel utilization factor (Uf-n) for each required DC output, and the predetermined utilization factors corresponding to the required DC outputs are provided in a "DC output vs. Uf" look-up table for each inverter 106a, 106b. Thus, the fuel utilization factor Uf-n, in which n identifies the specific inverter, is determined using the "DC output vs. Uf" look-up table based on the required DC output determined in the first step S1.

In a third step S3 of controller operation, the individual fuel utilization factors Uf-1, Uf-2, . . . Uf-n for each inverter 106a-b determined in the third step S2 are averaged to provide an average utilization factor Uf. In a fourth step S4, the controller determines a theoretical hydrogen content of fuel ("TH$_2$") supplied to the assembly 100. In particular, the composition of fuel supplied to the assembly 100 can be analyzed using a fuel composition analyzer, and the theoretical hydrogen content (TH$_2$) is then determined using the fuel composition analyzer. In the alternative, theoretical hydrogen content is calculated and manually entered based on expected composition of the fuel. For example, if the fuel composition analyzer determines that the fuel comprises methane ($CH_4$), ethane ($C_2H_6$) and propane ($C_3H_8$), the theoretical hydrogen content of the fuel will be equal to 4* % $CH_4$+7* % $C_2H_6$+ 10* % $C_3H_8$.

In the next step S5 of the controller operation, fuel demand, which corresponds to the amount of fuel flow, or the fuel flow rate, needed to support the electric power load receiving power from the assembly 100, is calculated. In particular, the fuel demand is determined by the controller as follows:

$$\text{Fuel Demand} = \frac{(\text{Required DC Output}) * (Faraday)}{Uf * TH_2} \quad (1)$$

in which Uf is the average fuel utilization factor determined in the third step S3, the Required DC Output is the DC output determined in the first step S1, $TH_2$ is the theoretical hydrogen content of fuel determined in the fourth step S4 and Faraday is calculated as follows:

$$Faraday = (\text{Number of Cells}) * \left(\frac{379.5 \ SCF/\text{lb-mole}}{453.6 \ \text{gr/lb}}\right) * 0.000310923 \quad (2)$$

in which the Number of Cells corresponds to the total number of fuel cells forming the fuel cell stacks 104A-D of the assembly 100.

After determining the fuel demand in step S5, the operation of the controller proceeds to a sixth step S6 in which the controller 300 controls the flow of fuel from the fuel supply to the multi-stack assembly 100. In particular, the controller 300 controls the fuel flow control valve 111 to establish the desired flow of fuel from the fuel supply 110 to the assembly 100 based on the fuel demand calculation result in step S5. The operation of the controller 300 thereafter returns to the first step S1 such that the controller 300 continually monitors the load requirements and the DC output needed from the assembly to satisfy the load requirements, and controls the fuel flow control valve 111 to adjust the flow of fuel to the assembly 100 in accordance with any changes in the load requirements and the calculated fuel demand.

As discussed above, the controller 300 also controls the amount of DC power drawn by each of the inverters 106a, 106b from the stacks or stack pairs connected thereto. Operation of the controller to determine the Inverter SP-n for each inverter and to control the inverters to draw DC power based on the determination of the Inverter SP-n is shown in FIG. 3B and will now be described.

As shown in FIG. 31B, in a first step S11, the controller determines the electric power load on the assembly 100 and the DC power output required from the assembly to satisfy the power load. In a second step S12, the controller determines the individual fuel utilization factor Uf-n for each inverter in the assembly, wherein n identifies the specific inverter, and in step S113, the controller averages the individual fuel utilization factors from step S12 to determine an average fuel utilization factor Uf. In a fourth step S14 of the controller operation shown in FIG. 3B, the controller 300 determines the fuel hydrogen content ($TH_2$). The operation of the controller 300 in the first, second, third and fourth steps S11-S14 is similar to steps S1-S4 discussed herein above with respect to FIG. 3A, and the detailed description thereof is therefore omitted.

In a fifth step S15 shown in FIG. 31B, the controller determines the actual fuel flow rate from the fuel supply to the assembly 100. The actual flow of fuel to the assembly 100 may be measured using a fuel flow meter, such as a thermal mass fuel flow meter, or a combination of a mass flow controller and an online fuel composition analyzer.

The operation of the controller 300 thereafter proceeds to step S16, in which the controller 300 determines an overall inverter set point (hereinafter "Inverter SP") using the actual fuel flow measured in the previous step S115, the average Uf value determined in the third step S13, and the fuel hydrogen content ($TH_2$) determined in step S14. The overall Inverter SP is calculated as follows:

$$\text{Inverter } SP = \frac{(\text{Actual Fuel Flow}) * Uf * TH_2}{Faraday} \quad (3)$$

wherein Faraday is calculated based on the total number of fuel cells in the assembly 100 using Equation (2).

After determining the overall Inverter SP in step S116, the operation of the controller 300 proceeds to a low selector step S17, in which the controller 300 determines whether the overall Inverter SP is smaller than or equal to the required DC output. If it is determined in step S17 that the overall Inverter SP value is smaller than or equal to the required DC output, then the calculated overall Inverter SP value is selected as a Selected Value in step S18. If, however, the controller determines that the Inverter SP value is greater than the required DC output, then the controller operation proceeds to step S19 in which the required DC output value is selected as the Selected Value. The selection of a smaller of the calculated Inverter SP and the required DC output as the Selected Value protects the assembly against an unrestrained increase in the Inverter SP due to temporary fuel flow increases. Therefore, an unrestrained increase in the DC power drawn by each inverter is avoided if the actual fuel flow temporarily increases above its set point, such as in a case of a sudden increase in the pressure of the fuel supplied to the assembly.

As shown in FIG. 31B, the Selected Value from step S18 or step S19 is used to calculate individual Inverter SP-n for each inverter in the assembly in step S20. Thus, if the controller selects in step S18 the overall Inverter SP as the Selected Value after determining in step S17 that the overall Inverter SP is smaller than or equal to the required DC output, the controller proceeds to step S20 to calculate an individual Inverter SP-n value for each inverter based on the overall Inverter SP determined in step S16. If the controller selects in step S19 the required DC output value after determining in step S17 that the overall Inverter SP is greater than the required DC output, the controller uses the required DC output value determined in step S11 to calculate in step S20 the individual Inverter SP-n value for each inverter. The individual Inverter SP-n values are calculated as follows:

$$\text{Inverter } SP - n = \frac{\text{Selected Value}}{\text{Number of Inverters}} \times \frac{Uf\text{-}n}{Uf} \quad (4)$$

wherein n is the number of the specific inverter, the Selected Value corresponds to the value selected in step S18 or step S19 after the determination in step S17, i.e. the smaller of the overall Inverter SP or the Required DC Output, the Uf-n is the individual utilization factor for the specific inverter n determined in step S12 and the Uf is the average utilization factor determined in step S13. The individual Inverter SP-n value calculated in step S20 corresponds to the amount of DC power that the inverter n draws from the fuel cell stack or stack pair to which the inverter is connected.

After the Inverter SP-n value is calculated for each inverter in step S20, the operation of the controller proceeds to step S21 in which the controller controls each inverter in the assembly 100 to draw DC power in accordance with the corresponding individual Inverter SP value calculated in step S20. It is understood that the controller operation thereafter returns to the first step S11 so that the controller continuously monitors the flow rate of fuel to the assembly and the required DC output, adjusts the individual Inverter SP values of the inverters in accordance with the fuel flow rate and the required DC output as shown in FIG. 3B and controls the DC power drawn by each inverter from the corresponding stack or stack pair.

Figure 4:
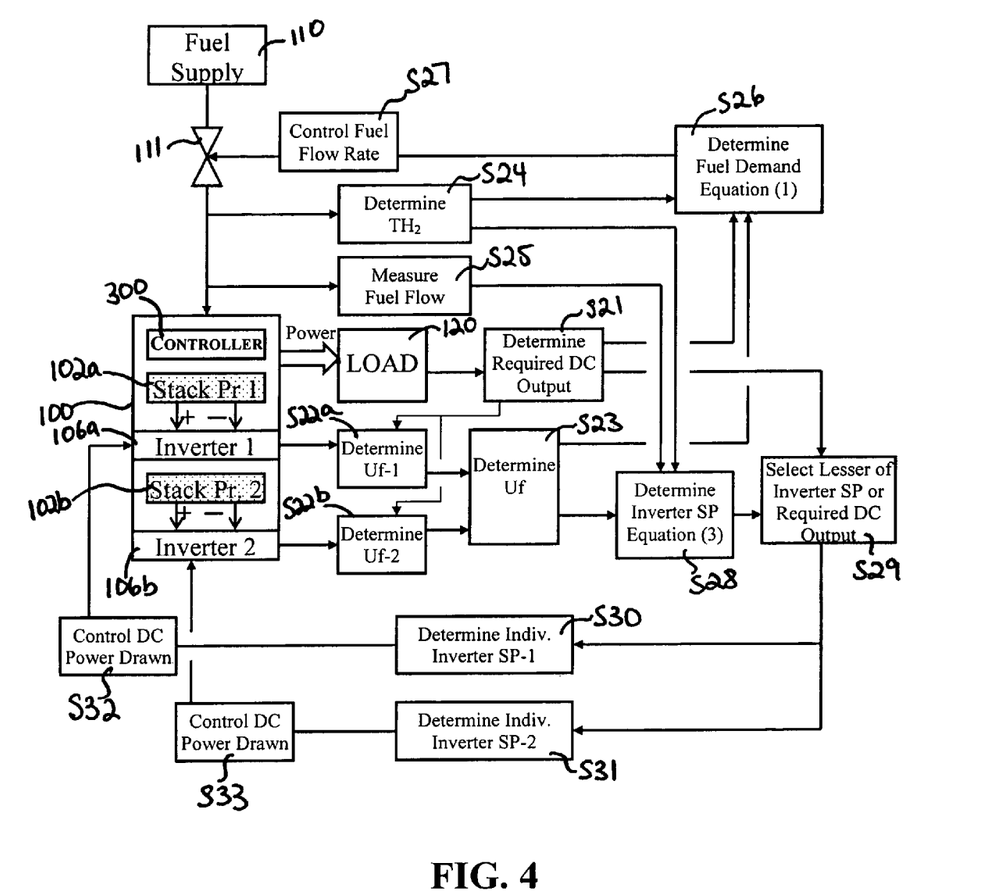
FIG. 4 shows operation of the controller of the multi-stack assembly of FIG. 2 combining the operations of FIGS. 3A and 3B.

It is also understood that the controller operations shown in FIGS. 3A and 3B and described herein above may be used together so that the utilization factor Uf, the theoretical fuel hydrogen content $TH_2$ and the required DC output determined by the controller are used for the determination of both the Fuel Demand and the Inverter SP, without requiring a separate determination of the Uf, $TH_2$ and required DC output for each of the calculations. In this way, the fuel flow to the assembly and the DC power drawn by each inverter are simultaneously controlled by the controller. Control operations of the controller 300 to control the assembly 100 of FIG. 2 are schematically illustrated in FIG. 4. In FIG. 4, the operations of the controller 300 to control the assembly 100 include controlling the fuel flow rate from the fuel supply to the assembly 100 as shown in FIG. 3A and controlling the DC power drawn by each of the inverters from their corresponding stack pairs, as shown in FIG. 3B.

As schematically shown in FIG. 4 and as described herein above with respect to FIG. 2, the assembly 100 includes the first fuel cell stack pair 102a connected to the first inverter 106a and the second fuel cell stack pair 102b connected to the second inverter 106b. The assembly 100 also includes the controller 300 for controlling the fuel flow rate from the fuel supply 110 to the assembly 100 and for controlling the DC power drawn by the first and second inverters 106a, 106b from the first and second stack pairs 102a, 102b, respectively. As discussed above, the electrical power generated by the assembly 100 is provided to a load 120 which consumes the electrical power.

As shown in FIG. 4, in a first step S21, the controller 300 of the assembly 100 determines, based on the load 120 requirements, the required DC output, which is the DC power the assembly 100 needs to produce in order to satisfy the load 120 requirements. In step S22a, the controller 300 determines a utilization factor Uf-1 for the first inverter 106a and in step S22b, the controller determines a utilization factor Uf-2 for the second inverter 106b. As discussed above with respect to FIG. 3A, the utilization factors Uf-1 and Uf-2 are determined based on the required DC output determined in the third step S23 using a DC output vs. Uf look-up table. Based on the Uf-1 and the Uf-2 determinations in the steps S22a and S22b of the controller operation, the controller 300 determines in step S23 the average Uf by averaging the Uf-1 and the Uf-2 values. In step S24, the controller calculates the theoretical fuel hydrogen content ($TH_2$) of the fuel supplied to the assembly 100 from the fuel supply 110. As discussed herein above with respect to FIG. 3A, the $TH_2$ may be determined by analyzing the content of the fuel and thereafter calculating the hydrogen content of the analyzed fuel content. The controller 300 also measures the actual flow rate of the fuel being supplied to the assembly 100 in step S25. As discussed above, the flow rate of the fuel may be measured using a flow meter, such as a thermal mass fuel flow meter.

The steps S21-S25 of controller operation in FIG. 4 are similar to steps S11-S15 in FIG. 3B. It is understood that the order in which the controller 300 determines the $TH_2$, the actual fuel flow, the required DC output and the Uf is not limited to the order herein discussed and may be varied to optimize the controller 300 processing requirements.

Using the determinations of the $TH_2$, the required DC output and the Uf in steps S24, S21 and S23, respectively, the controller 300 determines in step S26 the fuel demand, or the fuel flow rate which is needed to satisfy the load requirements, using Equation (1) provided above. Based on the fuel demand determination in step S26, the controller then controls in step S27 the fuel flow rate from the fuel supply 110 to the assembly 100 by controlling the fuel flow control valve 111.

Also, using the determinations of the $TH_2$, the measured actual fuel flow and the Uf in steps S24, S25 and S23, respectively, the controller 300 determines in step S28 the overall Inverter SP. In particular, the controller 300 uses Equation (3) provided and described above to calculate the Inverter SP. Step S28 shown in FIG. 4 is similar to step S16 in FIG. 3B.

After determining the overall Inverter SP in step S28, the controller proceeds to step S29 in which the controller compares and selects the smaller of the overall Inverter SP from step S28 and the required DC output from step S21. If the overall Inverter SP is equal to the required DC output, then the overall Inverter SP is selected. Step S29 is similar to steps S17-19 of FIG. 3B and detailed description thereof is omitted.

Using the value selected in step S29, i.e., the smaller of Inverter SP and the required DC output, the controller 300 determines in step S30 the individual Inverter SP-1 for the first inverter 106a and determines in step S31, the individual Inverter SP-2 for the second inverter 106b. As discussed above, the individual Inverter SP-1 for the first inverter 106a is determined in step S30 by dividing the value selected in step S29, i.e., either Inverter SP or required DC output, by the total number of inverters in the assembly, i.e., 2, and multiplying the result of the division by a factor Uf-1/Uf, as provided above in the Equation (4). Similarly, Equation (4) is used to determine the individual Inverter SP-2 for the second inverter 106b in step S31 by dividing the value selected in step S29 by the total number of inverters and multiplying the result by a factor Uf-2/Uf.

After the individual Inverter SP-1 is determined in S31, the operation of the controller 300 proceeds to step S32 in which the controller controls the amount of DC power drawn by the first inverter 106a from the first stack pair 102a based on the individual Inverter SP-1. Also, after the controller determines the individual Inverter SP-1 in step S31, the operation of the controller 300 proceeds to step S33 to control the amount of DC power drawn by the second inverter 106b from the second stack pair 102b based on the individual Inverter SP-2.

It is understood that the order of the controller operations in determining the fuel demand and the Inverter SP-n values for each inverter is not limited to the order described above. For example, determination of the fuel demand (Step S26) and control of the fuel flow rate (Step S27) may occur simultaneously with the determinations of the Inverter SP and individual Inverter SP-1 and Inverter SP-2 (Steps S28-S31) and controlling of the DC power drawn by the first and second inverters (Steps S32, S33).

It is further understood that the methods of controlling fuel flow to a multi-stack assembly and of controlling inverters in the multi-stack assembly as shown in FIGS. 3A, 3B and 4 and described above are not limited to the specific assembly 100 construction shown in FIG. 2, and may be applied to other multi-stack assemblies. For example, the controller operations shown in FIGS. 3A and 3B can be used in multi-stack assemblies that include one or more stack pairs, each of which is connected to an inverter, as well as to multi-stack assemblies comprising a plurality of stacks not arranged in pairs and connected with a plurality of inverters. Another illustrative embodiment of a multi-stack assembly 400 which includes a controller 500 operating as shown in FIGS. 3A and 3B is schematically illustrated in FIG. 5.

Figure 5:
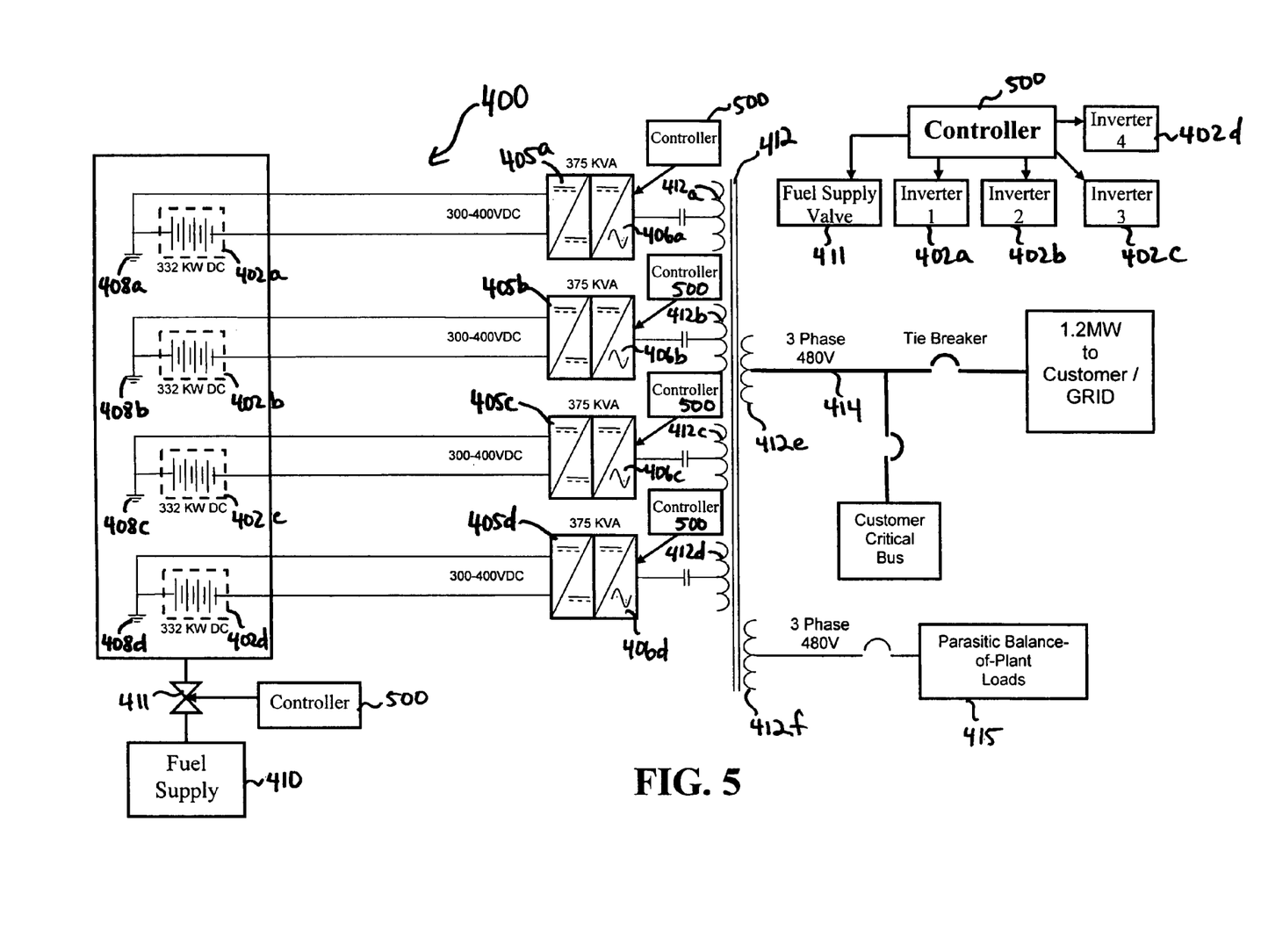
FIG. 5 shows another embodiment of a multi-stack assembly which is controlled as shown in FIGS. 3A and 3B.

As shown in FIG. 5, the assembly 400 comprises a plurality of fuel cell stacks 402*a-d* and a plurality of dedicated inverters 406*a-d*, each of which is coupled with a corresponding fuel cell stack 402*a-d*. The assembly 400 is supplied with fuel from a fuel supply 410 and with air gas from an air supply (not shown for purposes of clarity and simplicity). The flow of fuel from the fuel supply 410 to the assembly is adjusted using a fuel flow control valve 411, which is controlled by the controller 500 as described above with respect to FIG. 3A. Fuel supplied to the assembly 400 is divided within the assembly 400 using suitable piping (not shown) so as to supply fuel to each fuel cell stack 402*a-d*.

As shown, the assembly 400 includes a first stack 402*a* to which a first inverter 406*a* is connected, a second fuel cell stack 402*b* to which a second inverter 406*b* is connected, a third fuel cell stack 402*c* to which a third inverter 406*c* is connected and a fourth fuel cell stack 402*d* to which a fourth inverter 406*d* is connected. DC power produced by each of the first, second, third and fourth fuel cell stacks 402*a-d* is drawn by the first, second, third and fourth inverters 406*a-d*, respectively, and converted to AC power. Inverters suitable for use in the assembly 400 include standard sub-megawatt inverters or IGBT inverters.

In certain embodiments, the assembly 400 may also include a plurality of DC-to-DC converters, or DC choppers, 405*a-d* for converting DC power drawn from the fuel cell stacks 402*a-d* from one voltage to another. In the illustrative embodiment shown in FIG. 5, the assembly 400 includes a first DC-to-DC converter 405*a*, a second DC-to-DC converter 405*b*, a third DC-to-DC converter 405*c* and a fourth DC-to-DC converter 405*d*. The first DC-to-DC converter 405*a* is connected to, and draws DC power from, the first fuel cell stack 402*a* and outputs DC power at a different voltage to the first inverter 406*a*. The second DC-to-DC converter 405*b* is connected to, and draws DC power from, the second fuel cell stack 402*b* and outputs DC power at a different voltage to the second inverter 406*b*. The third DC-to-DC converter 405*c* is connected to, and draws DC power from, the third fuel cell stack 402*c* and outputs DC power at a different voltage to the third inverter 406*c*, and the fourth DC-to-DC converter 405*d* is connected to, and draws DC power from, the fourth fuel cell stack 402*d* and outputs DC power at a different voltage to the fourth inverter 406*d*.

As also shown in FIG. 5, each of the fuel cell stacks 402*a-d* is connected to a ground 408*a-d* so as to minimize the electrical potential of the fuel cell and the insulating requirements of the assembly.

As discussed above, DC power produced by each fuel cell stack 402*a-d* in FIG. 5 is supplied to the corresponding DC-to-DC converter, which outputs DC power at a different voltage to the corresponding inverter 406*a-d* for conversion to AC power. AC power produced by each inverter 406*a-d* is output to a common transformer 412 which steps up the voltage of the AC power to a predetermined level and supplies it to a customer bus 414. In the illustrative embodiment shown, the transformer 412 includes four primary windings 412*a-d*, with each primary winding 412*a-d* corresponding to one of the inverters 406*a-d*. The transformer 412 also includes a winding 412*e* coupled with the customer bus 414 and a dedicated winding 412*f* coupled plant loads, such as parasitic balance-of-plant loads 415.

The assembly 400 shown in FIG. 5 is controlled by the controller 500 which controls the flow rate of fuel supplied to the assembly 400 from the fuel supply 410 by controlling the fuel flow control valve 411. As discussed herein above with respect to FIGS. 3A and 4, the controller 500 determines the required DC output by the assembly 400 to satisfy the load on the assembly 400 (Step S1 of FIG. 3A), the individual utilization factor Uf-n for each inverter 406*a-d* based on the required DC output (Step S2 in FIG. 3A), the average utilization factor Uf by averaging the individual utilization factors Uf-n of all inverters 406*a-d* (Step S3 in FIG. 3A), and the theoretical fuel hydrogen content ($TH_2$) for the fuel being supplied to the assembly (Step S4 in FIG. 3A). Using the determined required DC output, Uf and $TH_2$, the controller then determines fuel demand using Equation (1) provided above (Step S5 in FIG. 3A) and controls the fuel flow control valve 411 to adjust the fuel flow to the assembly 400 based on the calculated fuel demand (Step S6 in FIG. 3A).

The controller 500 of the assembly 400 in FIG. 5 also controls each of the inverters 406*a-d* to draw an amount of DC power from the fuel cell stacks 402*a-d* to which these inverters are connected, as shown in FIGS. 3B and 4. As discussed herein above with respect to FIGS. 3B and 4, the controller 500 determines actual fuel flow from the fuel supply 410 to the assembly 400 (Step S15 in FIG. 3B), the DC output required to satisfy the load on the assembly 400 (Step S11 in FIG. 3B), the individual utilization factor Uf-n for each inverter 406*a-d* (Step S12 in FIG. 3B), the average Uf by averaging out the individual utilization factors Uf-n of all of the inverters (Step S13 in FIG. 3B) and the fuel hydrogen content ($TH_2$) (Step S14 in FIG. 3B).

Using the determined actual fuel flow, Uf and $TH_2$, the controller 500 then determines the overall Inverter SP (Step S16 in FIG. 3B). The controller 500 uses Equation (3) to calculate the overall Inverter SP. The controller 500 thereafter compares the calculated overall Inverter SP to the determined required DC output (Step S11 in FIG. 3B), and selects the smaller of the Inverter SP value and the required DC output value (Steps S18 and S19 in FIG. 3B), or the overall Inverter SP value if the overall Inverter SP is equal to the required DC output. The Selected Value is then used by the controller 500 to determine the individual Inverter SP-n value for each of the inverters 406*a-d* using Equation (4) (Step S20 in FIG. 3B). As mentioned above, n corresponds to the specific inverter for which the Inverter SP-n value is calculated. In this illustrative embodiment shown in FIG. 5, the controller 500 calculates Inverter SP-1 for the first inverter 406*a*, Inverter SP-2 for the second inverter 406*b*, Inverter SP-3 for the third inverter 406*c* and Inverter SP-4 for the fourth inverter 406*d*. Based on these calculated individual Inverter SP-n values, the controller 500 controls each of the inverters 406*a-d* by controlling the power drawn by each inverter 406*a-d* from the respective fuel cell stacks 402*a-d* (Step S21 in FIG. 3B).

It is understood that the controller 500 continuously controls each of the inverters 406*a-d* by repeating the above-described operating steps. It is also understood that the fuel flow controlling operations and the inverter controlling operations of the controller 500 may be performed simultaneously and may be combined, similar to FIG. 4, such that the Uf-n, the Uf, the $TH_2$ and the required DC output are determined for both controlling the fuel flow and the inverters.

It should be noted that the controller can be a conventional PLC (programmable logic controller—essentially highly reliable robust computer) made by GE. The control program used, in turn, can be a software product called "Versapro" again a GE product implementable in GE PLCs for industrial automation.

In all cases it is understood that the above-described arrangements are merely illustrative of the many possible specific embodiments, which represent applications of the present invention. Numerous and varied other arrangements can be readily devised in accordance with the principles of the present invention without departing from the spirit and the scope of the invention.

What is claimed is:

1. A multi-stack assembly receiving fuel from a fuel supply and producing power output for consumption by a load, said assembly comprising:

a plurality of fuel cell stacks for producing DC power, said plurality of fuel cell stacks forming one or more fuel cell stack groups, wherein each of said fuel cell stack groups includes at least first and second fuel cell stacks connected in series;

one or more inverters corresponding to said one or more of fuel cell stack groups, wherein each of said inverters draws a predetermined amount of DC power from a corresponding fuel cell stack group and converts said DC power to AC power; and a controller for controlling each of said inverters to draw the predetermined amount of DC power from said corresponding fuel cell stack group so as to satisfy power requirements of said load, wherein the series connection of said first and second fuel cell stacks in each of said fuel cell stack groups is at ground, wherein said controller controls each of the inverters by determining an individual inverter set point for each said inverter corresponding to the predetermined amount of DC power to be drawn by said inverter from said corresponding fuel cell stack group and wherein said individual inverter set point is determined based on an actual flow rate to said assembly, DC power required from said assembly to satisfy load requirements, individual fuel utilization factor for each said inverter, and a hydrogen content of said fuel supplied to said assembly.

2. A multi-stack assembly in accordance with claim 1, wherein for a first fuel cell stack group of said one or more fuel cell stack groups: one of a positive side and a negative side of the first fuel cell stack of that fuel cell stack group is coupled with an opposing one of a positive side and a negative side of the second fuel cell stack of that fuel cell stack group forming the series connection of said first and second fuel cell stacks of that fuel cell stack group, and a first inverter of said one or more inverters is coupled with the other one of said positive side and said negative side of the first fuel cell stack of that fuel cell stack group and with the other opposing one of said positive side and said negative side of said second fuel cell stack of that fuel cell stack group.

3. A multi-stack assembly in accordance with claim 1, wherein said assembly comprises at least a first fuel cell stack group, a second fuel cell stack group, a first inverter coupled with said first fuel cell stack group and a second inverter coupled with said second fuel cell stack group, said controller controlling said first inverter to draw a first amount of DC power from said first fuel cell stack group and controlling said second inverter to draw a second amount of DC power from said second fuel cell stack group.

4. A multi-stack assembly in accordance with claim 3, wherein:

one of a positive side and a negative side of the first fuel cell stack of the first fuel cell stack group is coupled with an opposing one of a positive side and a negative side of the second fuel cell stack of the first fuel cell stack group forming the series connection of the first and second fuel cell stacks of the first fuel cell stack group, and said first inverter is coupled with the other one of said positive side and said negative side of said first fuel cell stack of the first fuel cell stack group and with the other opposing one of said positive side and said negative side of said second fuel cell stack of the first fuel cell stack group; and one of a positive side and a negative side of said first fuel cell stack of the second fuel cell stack group is coupled with an opposing one of a positive side and a negative side of said second fuel cell stack of the second fuel cell stack group forming the series connection of the first and second fuel cell stacks of the second fuel cell stack group, and said second inverter is coupled with the other one of said positive side and said negative side of said first fuel cell stack of the second fuel cell stack group and with the other opposing one of said positive side and said negative side of said second fuel cell stack of the second fuel cell stack second group.

5. A multi-stack assembly in accordance with claim 4, wherein said first fuel cell stack of said first fuel cell stack group and said second fuel cell stack of said second fuel cell stack group are coupled with a first grounding unit and said second fuel cell stack of said first fuel cell stack group and said first fuel cell stack of said second fuel cell stack group are coupled with a second grounding unit.

6. A multi-stack assembly in accordance with claim 4, wherein said first and second fuel cell stacks of said first and second fuel cell stack groups are coupled with a central grounding unit.

7. A multi-stack assembly in accordance with claim 4, wherein said controller controls said first inverter by determining a first inverter set point corresponding to the first amount of DC power to be drawn by said first inverter from said first fuel cell stack group and controls said second inverter by determining a second inverter set point corresponding to the second amount of DC power to be drawn by said second inverter from the second fuel cell stack group, wherein said first and second inverter set points are determined based on actual fuel flow rate to said assembly, DC power required from said assembly to satisfy said load requirements, a first fuel utilization factor for said first inverter, a second fuel utilization factor for said second inverter and a hydrogen content of said fuel supplied to said assembly.

8. A multi-stack assembly in accordance with claim 7, wherein said determining of said first and second inverter set points comprises:

determining an overall inverter set point, comparing said overall inverter set point with said DC power required from said assembly, and if said overall inverter set point is smaller than or equal to said DC power required from said assembly, determining said first inverter set point and said second inverter set point based on said overall inverter set point, and if said overall inverter set point is greater than said DC power required from said assembly, determining said first inverter set point and said second inverter set point based on said DC power required from said assembly.

9. A multi-stack assembly in accordance with claim 8, wherein said overall inverter set point is equal to:

$$\frac{(\text{Actual Fuel Flow}) * Uf * TH_2}{Faraday}$$

wherein Uf is an average fuel utilization factor based on said first and second fuel utilization factors, said $TH_2$ is said hydrogen content of said fuel and said Faraday is equal to:

$$\text{(Number of fuel cells)} * \left( \frac{379.5 \; SCF/\text{lb-mole}}{453.6 \; \text{gr/lb}} \right) * 0.000310923$$

wherein said number of fuel cells corresponds to a total number of fuel cells forming said first and second fuel cell stack groups.

10. A multi-stack assembly in accordance with claim 9, wherein said first and second inverter set points are equal to:

$$\frac{\text{Selected Value}}{\text{Number of Inverters}} \times \frac{Uf\text{-}n}{Uf}$$

wherein said Selected Value is the smaller one of said overall inverter set point and said DC power required from said assembly, said Number of Inverters is 2, said Uf-n is said one of said first fuel utilization factor and said second fuel utilization factor, and said Uf is the average fuel utilization factor.

11. A multi-stack assembly in accordance with claim 7, further including a fuel supply control member for controlling fuel flow rate of fuel to said assembly, and wherein said controller controls said fuel supply control member in accordance with a fuel demand.

12. A multi-stack assembly in accordance with claim 11, wherein said controller determines said fuel demand based on DC power required from said assembly to satisfy said load requirements, first fuel utilization factor for said first inverter, second fuel utilization factor for said second inverter and a hydrogen content of said fuel supplied to said assembly.

13. A multi-stack assembly in accordance with claim 12, wherein said fuel demand is equal to:

$$\frac{\text{(Required DC Output)} * (Faraday)}{Uf * TH_2}$$

wherein Uf is an average fuel utilization factor based on said first and second fuel utilization factors, said $TH_2$ is said hydrogen content of said fuel and said Faraday is equal to:

$$\text{(Number of Fuel Cells)} * \left( \frac{379.5 \; SCF/\text{lb-mole}}{453.6 \; \text{gr/lb}} \right) * 0.000310923$$

wherein said Number of Fuel Cells corresponds to a total number of fuel cells forming said first and second fuel cell stack groups.

14. A multi-stack assembly in accordance with claim 1, wherein
said determining of said individual inverter set point comprises: determining an overall inverter set point;
comparing said overall inverter set point with said DC power required from said assembly; and
if said overall inverter set point is smaller than or equal to said DC power required from said assembly, determining said individual inverter set point based on said overall inverter set point, and if said overall inverter set point is greater than said DC power required from said assembly, determining said individual inverter set point based on said DC power required from said assembly.

15. A multi-task assembly in accordance with claim 14, wherein said overall inverter set point is equal to:

$$\frac{\text{(Actual Fuel Flow)} * Uf * TH_2}{Faraday}$$

wherein Uf is an average fuel utilization factor based on said individual fuel utilization factors, said $TH_2$ is said hydrogen content of said fuel and said Faraday is equal to:

$$\text{(Number of fuel cells)} * \frac{(379.5 \; SCF/\text{lb-mole})}{453.6 \; \text{gr/lb}} * 0.000310923$$

wherein said number of fuel cells corresponds to a total number of fuel cells forming said fuel cell stacks of said assembly.

16. A multi-stack assembly in accordance with claim 15, wherein said individual inverter set point is equal to:

$$\frac{\text{Selected Value}}{\text{Number of Inverters}} \times \frac{Uf - n}{Uf}$$

wherein said Selected Value is the smaller one of said overall inverter set point and said DC power required from said assembly, said Number of Inverters is a total number of said one or more inverters, said Uf-n is said individual fuel utilization factor for said corresponding inverter, and said Uf is the average fuel utilization factor.

17. A multi-stack assembly in accordance with claim 1, further comprising a fuel supply control member for controlling fuel flow rate of fuel to said assembly, wherein said controller controls said fuel supply control member in accordance with a fuel demand.

18. A multi-stack assembly in accordance with claim 17, wherein said controller determines said fuel demand based on DC power required from said assembly to satisfy said load requirements, individual fuel utilization factor for each of said inverters and a hydrogen content of fuel supplied to said assembly.

19. A multi-stack assembly in accordance with claim 18, wherein said fuel demand is equal to:

$$\frac{\text{(Required DC Output)} * (Faraday)}{Uf * TH_2}$$

wherein Uf is equal to said average fuel utilization factor, $TH_2$ is said hydrogen content of said fuel and said Faraday is equal to:

$$\text{(Number of fuel cells)} * \frac{(379.5 \; SCF/\text{lb-mole})}{453.6 \; \text{gr/lb}} * 0.000310923$$

wherein said Number of Fuel Cells corresponds to a total number of fuel cells forming said plurality of fuel cell stacks.

20. A method of controlling a multi-stack assembly receiving fuel from a fuel supply and producing power output for consumption by a load, said assembly comprising a plurality of fuel cell stacks for producing DC power, said fuel cell stacks forming one or more fuel cell stack groups, each of said fuel cell stack groups including at least first and second fuel cell stacks connected in series, and one or more inverters corresponding to said one or more fuel cell stack groups, wherein each of said inverters draws a predetermined amount of DC power from a corresponding fuel cell stack group and converts said DC power to AC power, and wherein the series connection of said first and second fuel cell stacks of each of said of said fuel cell stack groups is at ground, said method comprising:

controlling each of said inverters to draw the predetermined amount of DC power from said corresponding fuel cell stack group so as to satisfy power requirements of said load;

wherein said each of said inverters is controlled by determining an individual inverter set point for each said inverter corresponding to the predetermined amount of DC power to be drawn by said inverter from said corresponding fuel cell stack group and wherein said individual inverter set point is determined based on an actual flow rate to said assembly, DC power required from said assembly to satisfy load requirements, individual fuel utilization factor for each said inverter, and a hydrogen content of said fuel supplied to said assembly.

21. A method of controlling a multi-stack assembly in accordance with claim 20, wherein said controlling comprises determining an individual inverter set point for each of said inverters, said individual inverter set point being used to control the predetermined amount of DC power drawn by said inverter from said stack group.

22. A method of controlling a multi-stack assembly in accordance with claim 21, wherein said controlling further comprises:

determining DC power required from said assembly to satisfy power requirements of said load;

determining an individual utilization factor for each inverter based on said determination of said DC power required from said assembly;

determining an average utilization factor based on said individual utilization factors;

determining a hydrogen content of fuel supplied to said assembly;

determining an actual fuel flow rate from said fuel supply to said assembly;

determining an overall inverter set point based on said actual fuel flow rate, said average utilization factor and said hydrogen content of fuel;

selecting a smaller value of said overall inverter set point with said DC power required from said assembly as a Selected Value; and determining said individual inverter set point for each inverter using said Selected Value.

23. A method of controlling a multi-stack assembly in accordance with claim 22, wherein said overall inverter set point is equal to:

$$\frac{(\text{Actual Fuel Flow}) * Uf * TH_2}{\text{Faraday}}$$

wherein Uf is said average fuel utilization factor, $TH_2$ is said hydrogen content of said fuel and said Faraday is equal to:

$$(\text{Number of fuel cells}) * \frac{(379.5\ SCF/\text{lb-mole})}{453.6\ \text{gr/lb}} * 0.000310923$$

wherein said Number of fuel cells corresponds to a total number of fuel cells forming said plurality of fuel cell stacks.

24. A method of controlling a multi-stack assembly in accordance with claim 23, wherein said individual inverter set point for said inverter is equal to:

$$\frac{\text{Selected Value}}{\text{Number of Inverters}} \times \frac{Uf - n}{Uf}$$

wherein said Number of Inverters is equal to a total number of said plurality of inverters, said Uf-n is said individual fuel utilization factor for said inverter and said Uf is the average fuel utilization factor.

25. A method of controlling a multi-stack assembly in accordance with claim 21, wherein said multi-stack assembly further comprises a fuel supply control member for controlling fuel flow rate of fuel from said fuel supply to said assembly, said method further comprising controlling said fuel supply control member in accordance with a fuel demand determined by said controller.

26. A method of controlling a multi-stack assembly in accordance with claim 25, said controlling said fuel supply member comprising:

determining DC power required from said assembly to satisfy power requirements of said load;

determining an individual fuel utilization factor for each inverter based on said determination of said DC power required from said assembly;

determining an average utilization factor based on said individual utilization factors;

determining a hydrogen content of fuel supplied to said assembly; and determining said fuel demand based on said determinations of said DC power required from said assembly to satisfy said power requirements of said load, said average fuel utilization factor and said hydrogen content of said fuel.

27. A method of controlling a multi-stack assembly in accordance with claim 26, wherein said fuel demand is equal to:

$$\frac{(\text{Required DC Output}) * (\text{Faraday})}{Uf * TH_2}$$

wherein said Required DC Output is the DC power required from the assembly to satisfy said power requirements of said load, said Uf is equal to said average fuel utilization factor, said $TH_2$ is said hydrogen content of said fuel and said Faraday is equal to:

$$(\text{Number of Fuel Cells}) * \frac{(379.5 \; SCF/\text{lb-mole})}{453.6 \; \text{gr/lb}} * 0.000310923$$

wherein said Number of Fuel Cells corresponds to a total number of fuel cells forming said plurality of fuel cell stacks.

28. A programmed computer controller for carrying out the method of claim 22.

29. A program on a computer readable medium for execution by a computer controller to execute the steps of the method of claim 22.

* * * * *